United States Patent Office 2,903,360
Patented Sept. 8, 1959

2,903,360

METHOD OF MAKING QUICK-COOKING CEREALS FROM PARBOILED GRAINS

Edward Seltzer, Teaneck, N.J., assignor to Thomas J. Lipton, Inc., Hoboken, N.J., a corporation of Delaware No Drawing. Application April 5, 1955
Serial No. 499,521

5 Claims. (Cl. 99—80)

This invention relates to the processing of edible cereals and it relates particularly to the preparation of quick-cooking rice for table use or as a component of dried, semi-liquid or liquid soup mixes and the like.

The requirements for a satisfactory quick-cooking rice product are critical. When cooked for use directly on the table as a cereal or as a cereal component of a foodstuff, the rice should be fluffy and tender, the grains of rice should be well-formed and whole, and the flavor must be similar to that of freshly cooked rice made by prolonged cooking of raw milled rice.

The requirements for a satisfactory quick-cooking rice for use as a component of a soup mix are similar but even more difficult to attain. Not only must the rice have all of the above-mentioned characteristics, but it must be capable of cooking in about the same time required to convert the soup mix into the liquid soup, without the rice grains breaking or becoming mushy; not only that, but they should be able to withstand reheating in the soup without disintegrating.

Many processes have been suggested heretofore for making quick-cooking rice. I have suggested and disclose in my copending application Serial No. 383,405, filed September 30, 1953, a process which is capable of producing a high quality quick-cooking rice product having all of the necessary characteristics for use on the table or as a component of a soup mix.

As disclosed in application Serial No. 383,405, the method involves soaking the milled raw rice or other grain such as barley, subjecting it to a pressure-cooking operation to gelatinize and condition the starch of the rice, then agitating and rinsing the cooked rice to separate the rice grains and clean and lubricate their surfaces so that they can be subjected to momentary compression without crushing or disintegrating, for example, by passing the grains between closely spaced pressing rollers thereby to modify the physical characteristics of the grains and render them quick-cooking. The compressed grains are dried after compression to preserve them and facilitate packaging and marketing.

All of these operations require close control, are time consuming and require special expensive equipment so that the production of a satisfactory product is not obtained with all of the facility to be desired.

The present invention relates to an improvement over my prior process by means of which all of the advantages of my prior process may be realized but in a simpler and more efficient manner.

More particularly, I have found that a high quality quick-cooking rice product suitable for table use or as a component of dried, liquid or paste soup mixes can be made quickly and uniformly from parboiled rice, a product that is readily available on the open market in a number of varieties. Parboiling of rice is practiced by several large rice mills in the United States in order to recover from the husks of unmilled rice certain nutrient factors which are transferred to the grains of rice by the parboiling operation. Parboiled rice is not a quick-cooking rice. It actually requires a cooking period of 25 to 30 minutes before reaching a satisfactory tenderness. This is little, if any, better than the time required to cook milled raw rice. However, I have found that parboiling conditions the rice so that it can be further treated to convert it into a high quality quick-cooking product.

In general, the new process comprises soaking the washed and cleaned parboiled rice to cause it to imbibe water until the water imbibed by the rice attains an equilibrium condition in which the rice grains are about saturated with water at the temperature of the water. It has been found that equilibrium of the water content of the grains is reached most conveniently by soaking the rice in water for between about two and five hours and at a temperature in a range between about 50° and 82° F. Higher temperatures can be used to produce an equilibrium condition in which the grains have a higher moisture content. The higher moisture content does not appear to have any practical advantage or disadvantage other than requiring more moisture to be removed from the grains when they are finally dried. Temperatures in the range of 130° F. to 160° F. increase the moisture content of the grains to between 65% and 77% as compared with moisture contents between about 45% and 55% in the grains when soaked in the temperature range between 50° F. and 82° F. By way of example, it has been found that long-grain Texas Patna rice will imbibe water to attain a moisture content in the vicinity of about 45% to 50% in three and one-half hours soaking and that prolonged soaking beyond this time, even for as much as eighteen hours, will only increase the moisture content about 2½%. Other long-grained parboiled rices, such as Blue Bonnett rice, attain a moisture content of 50% to 52% in three and one-half hours and their moisture content only increases to 54.2% after about sixteen hours of soaking. Accordingly, while more prolonged soaking is possible, no particular advantage is derived therefrom.

At the conclusion of the soaking operation, the rice is removed from the soaking tank or vat and, after draining, is charged into the tank of boiling water where the rice is boiled with agitation or at a rolling boil to keep the grains separate until they become somewhat resilient or rubbery in texture. The boiling operation is of short duration requiring only about two to five minutes but during this time the moisture content of the rice may increase 10% to 15% or more. Inasmuch as the cooking operation is of short duration, high production rates are obtained even when using batch cooking and soaking operations.

The rubbery grains are separated from the boiling water and are immediately cooled and washed with cold water to provide a film of water on the surfaces of the grain and also make certain that the grains will not be stuck together by starch or other substance on their surfaces.

I have found that the temperature of the grains should be reduced to about 130° F. or less. For easiest control of the cooling operation, the rice may be sprayed with cold water until the rice is cooled to the temperature of the cooling water. Cooling can also be accomplished by immersing the grains in cold running water.

Subsequent processing of the grains includes squeezing them momentarily without crushing or rupturing the micelle of the grain. The squeezing operation can be accomplished most conveniently by passing the grains between rotating rollers which are spaced apart a distance between about one-fifth and one-third the thickness of the rice grains. The spacing of the rollers is varied depending upon the average size or thickness of the grains and the preliminary processing. For example, if the grains are cooled to only about 130° F., the gap between the rollers should be somewhat larger than when the grains are cooled to a lower temperature because the grains are somewhat softer when warm and thus more likely to be crushed than when they are cooler.

Following the pressing operation, the grains are rinsed to remove any surface starch and then they are dried, for example, by direct contact with heated air in a drying tower of conventional type. Usually the rice is dried to approximately its initial moisture content or in any event to a moisture content sufficiently low to prevent spoilage of the rice, i.e., between about 5% and 15%.

The rice products produced as described above can be cooked in about ten minutes by ordinary cooking techniques, and the product is light and fluffy and has a minimum of broken or misshapen grains therein. The short time required to cook the new rice product corresponds very closely to the time required for preparing a soup from a dry soup mix or a liquid or a soup paste so that by the time the soup has been prepared, the rice attains the desired tenderness without breaking or cooking to a mushy condition.

By way of a typical example of the method, a long-grain parboiled rice which was purchased commercially under the name of "Uncle Ben" long-grain rice and manufactured by the Uncle Ben Converted Rice Company, was first rinsed to remove dirt and superficial loose starch from the grains and then soaked in water at 70° F. with mild agitation for three and one-half hours. At the end of this time the moisture content of the rice had increased to 45%. The soaked rice was then transferred to a vat of boiling water where it was boiled at a rolling boil for three minutes. The amount of boiling water was sufficient to keep the individual grains in suspension and was in the proportion of one gallon of water for each two and one-half pounds of rice. At the end of three minutes of boiling, the rice grains had acquired a noticeable rubberiness or resiliency, and their moisture content had increased to 62.6%. The hot boiled grains were separated from the boiling water by pouring the boiling water and rice through a large strainer or screen. The rice retained on the strainer was cooled by sprays of water directed against it to terminate the heating operation, clean the surfaces of the grains and provide a film of water thereon for lubricating the grains during a subsequent squeezing operation. The temperature of the cooling water was about 70° F. and it was sprayed against the rice grains until they attained a temperature of about 70° F.

The cooled and wet grains were then delivered in a stream between the pair of revolving rollers where the grains were subjected to a momentary compression. The rolls used for squeezing the grains were 11⅜ inches in diameter and 12 inches long and were rotated at a speed of about 40 r.p.m. The rollers were set with a gap of 0.020 inch between them which was approximately one-third to one-fourth of the thickness of the grains prior to rolling. In this way, the grains are momentarily squeezed and then are allowed to expand. Compression of the grains in the manner described and while they have a high moisture content produces a more tender and fluffy product than when the grains are dried before squeezing. Moreover, the presence of moisture on the clean surfaces of the grains prevents them from sticking together during the feeding and squeezing operation and allows them to arrange themselves in a layer of single grain thickness which thereby avoids oversqueezing, crushing and pasting together of the grains.

Following the momentary squeezing of the grains, they were rinsed with water to remove any surface starch or liquid that might have exuded from the grain during squeezing and the product was then dried in a commercial drier of the circulating heated air type to reduce the moisture content to below about 15%. Following drying, the dried product which had formed into clumps was sifted through a 4 x 4 mesh screen to break up the clumps and then was sifted on a gyratory shaker having a 12 or 13 mesh screen to remove dust and grain fragments.

For purposes of comparison, the characteristics of the rice in so far as moisture content, as received and before rolling or squeezing and average dimensions are concerned, as received, and before and after rolling and following drying, are set forth in the following table:

TABLE I

[Pressure rolled at aperture=.020 in.]

| | Percent Moisture | Width | Thickness | Length |
| --- | --- | --- | --- | --- |
| Uncle Ben, dry, as received | 11.0 | .0697 | .0661 | 0.280 |
| before rolling | 62.6 | .0867 | .0762 | 0.362 |
| after rolling | | .0870 | .0673 | 0.383 |
| Finished Dried Grains | | .0932 | .0600 | 0.361 |

The length of the grains of the finished rice product is about 30% greater than that of the starting product, the thickness is about 10% less than the original dried grains and the width is about 34% greater than the original grains. Not all of the dimensional change in the grains is due to the rolling or squeezing operation. Rice grains which were treated in the manner described, but not rolled increased in width about 26%, in length about 25% and decreased in thickness about 8.3%. The fact that the grains were not deformed more or flaked by the rolling operation demonstrates the resiliency and high "spring back" of the grains at the time they were rolled. Nevertheless, the grains are well-formed, they have a minimum of fissures, cracks or crevices therein, they are somewhat opaque and resemble quite closely, except for the change in dimensions, the original parboiled rice.

*Example II*

Parboiled Rexoro rice, a long-grain rice, available commercially under the name of "River Brand," was treated in a similar manner with the following exceptions. The "River Brand" rice was soaked for three and one-half hours at which time it had attained a moisture content of 50.2%. This rice, after soaking, was boiled for four minutes until it attained the desired rubberiness and was subsequently cooled to about room temperature by spraying with cold water and then pressure rolled through an aperture of .020 inch width. The characteristics of the dried rice, the rice before rolling and after rolling and the finished dried grains are set forth in the following table.

TABLE II

| River Brand Parboiled Rexoro | Percent Moisture | Width | Thickness | Length |
| --- | --- | --- | --- | --- |
| dry, as received | 7.8 | .0734 | .0608 | 0.247 |
| before rolling | 63.2 | .0898 | .0756 | 0.359 |
| after rolling | | .0894 | .0677 | 0.369 |
| Finished Dried Grains | | .0926 | .0568 | 0.347 |

The length and width of the finished dried grains were greater than the length and width of the parboiled rice as received and the thickness of the rice grains was less in about the same proportion as indicated in Table I.

Similar results have been obtained with Blue Bonnet parboiled rice, also purchased commercially under the name of "River Brand." This rice can be treated in essentially the same manner as the Rexoro rice.

While typical gap settings of the squeezing rollers have been indicated in the preceding examples, these settings will vary not only with the kind of rice being processed but with the diameters of the rollers used in the machine.

Thus, when the rollers are of smaller diameter than the rollers of the squeezing device described above, wider settings between the rollers will be required to avoid crushing of the grains. Roller spacings as large as 0.050 inch have been used with rollers six inches in diameter, while roller spacings as low as 0.014 inch have been used with rollers having a diameter of 11⅜ inches. Moreover, it has been found that when the rice is cooled to a lower temperature following boiling, the settings can be smaller or closer than when the rice is squeezed at a higher temperature.

For example, "Uncle Ben" rice cooled to 130° F. requires a setting of 0.024 inch as compared to 0.020 inch when the same rice is cooled to around 70° F. The actual setting of the gap can be readily determined inasmuch as it must be sufficient to squeeze the grains to a minor fraction of their initial thickness but to not rupture or crush them.

From the preceding description of typical examples of the process and the general conditions and principles underlying my new process, it will be apparent that I have devised a highly effective method of producing quick-cooking rice having the characteristics required for a high quality table product and a high quality component of soups, and enabling the attainment of readily reproducible results in large and small batch or continuous operations.

It will also be apparent from the description that the process is susceptible to considerable variation in the temperatures and times involved in the soaking and boiling treatments and in the setting of the rolls and in the washing of the products and, therefore, the specific examples given herein should be considered as illustrative and not as limiting the scope of the following claims.

I claim:

1. A method of making quick-cooking rice comprising soaking grains of parboiled rice in water at a temperature between about 50° F. and 160° F. for a period of time sufficient to saturate substantially the grains at the temperature of the water, introducing the soaked rice grains into boiling water and boiling them for about 2 to 5 minutes to increase their moisture content and render the grains rubbery, separating the boiled grains from the boiling water, spraying the grains with cold water to reduce their temperature to not substantially more than 130° F. and thereby lubricate and separate the grains, momentarily squeezing the cooled and lubricated grains to about ⅓ to ⅕ of their thickness, washing the grains to clean their surfaces and drying them to a moisture content sufficiently low to stabilize and preserve them.

2. A method of making quick-cooking rice comprising soaking parboiled rice in water at a temperature between about 50° F. and 82° F., to substantially saturate the rice at the temperature of the water, boiling and agitating the soaked rice for about 2 to 5 minutes to separate the grains and render them rubbery, straining the rice from the boiling water and spraying it with cold water to reduce the temperature of the rice to not substantially more than 130° F. and lubricate and maintain the grains separate, momentarily squeezing the cooled and lubricated grains to between about ⅓ and ⅕ of their thickness, washing the grains to clean their surfaces and then drying the grains to a moisture content of about 5% to 15%.

3. A method of making quick-cooking rice comprising soaking parboiled rice in water at about 70° F. for a period of about three and one-half hours to cause the rice to imbibe substantially all of the water it can at the temperature of the water, transferring the rice to boiling water and boiling and agitating the rice for about 2 to 5 minutes, separating the rice from the water and spraying it with cold water to reduce the temperature of the rice to below 130° F. and lubricate the grains, squeezing the cooled and lubricated grains momentarily to between about ⅓ and ⅕ of their thickness, washing the grains and drying them.

4. A method of making quick-cooking rice comprising soaking grains of parboiled rice in water to cause them to imbibe water and increase their moisture content to between about 45% and 55%, then boiling the soaked grains for a period of about 2 to 5 minutes, cooling the boiled grains to a temperature below about 130° F., washing the grains applying a lubricating film of water to the grains, squeezing the washed and lubricated grains momentarily to between about ⅕ and ⅓ of their thickness, and thereafter drying the grains.

5. The method set forth in claim 4 in which soaked grains are boiled at a rolling boil for about three and one-half minutes.

References Cited in the file of this patent

UNITED STATES PATENTS

| | | |
|---|---|---|
| 400,835 | Donelson | Apr. 2, 1889 |
| 2,438,939 | Ozai-Durrani | Apr. 6, 1948 |
| 2,733,147 | Ozai-Durrani | Jan. 31, 1956 |

FOREIGN PATENTS

| | | |
|---|---|---|
| 657,691 | Great Britain | Sept. 26, 1951 |
| 152,406 | Australia | Apr. 19, 1951 |